(12) United States Patent
Fu

(10) Patent No.: US 8,690,123 B2
(45) Date of Patent: Apr. 8, 2014

(54) FLAPPER DRAIN VALVE ADJUSTING STRUCTURE

(71) Applicant: Xiamen Runner Industrial Corporation, Xiamen (CN)

(72) Inventor: Yiz-hou Fu, Xiamen (CN)

(73) Assignee: Xiamen Runner Industrial Corporation, Xiamen (CN)

( * ) Notice: Subject to any disclaimer, the term of this patent is extended or adjusted under 35 U.S.C. 154(b) by 0 days.

(21) Appl. No.: 13/763,484

(22) Filed: Feb. 8, 2013

(65) Prior Publication Data

US 2014/0054482 A1 Feb. 27, 2014

(30) Foreign Application Priority Data

Aug. 27, 2012 (CN) ...................... 2012 2 0427345 U

(51) Int. Cl.
*F16K 1/16* (2006.01)
(52) U.S. Cl.
USPC ................................ 251/298; 137/270; 4/393
(58) Field of Classification Search
USPC .................... 251/15, 20, 88, 298, 301, 367; 137/15.23, 270, 448; 4/378, 392, 393
See application file for complete search history.

(56) References Cited

U.S. PATENT DOCUMENTS

| | | | | |
|---|---|---|---|---|
| 2,779,028 A | * | 1/1957 | Branch | 4/393 |
| 3,341,863 A | * | 9/1967 | Schultz et al. | 4/386 |
| 4,698,859 A | * | 10/1987 | Freed | 4/393 |
| 5,090,066 A | * | 2/1992 | Schoepe et al. | 4/378 |
| 6,401,269 B1 | * | 6/2002 | Andersen et al. | 4/393 |
| 6,415,456 B1 | * | 7/2002 | Lordahl et al. | 4/393 |
| 8,104,103 B2 | * | 1/2012 | Han | 4/393 |
| 8,196,898 B1 | * | 6/2012 | Huang | 251/298 |

* cited by examiner

*Primary Examiner* — John K Kristoe, Jr.
*Assistant Examiner* — Matthew W Jellett
(74) *Attorney, Agent, or Firm* — Chun-Ming Shih

(57) ABSTRACT

Disclosed is a flapper drain valve adjusting structure including at least two installation positions disposed at connecting positions of a flapper body and a swinging link rod, a rotating shaft with its axis perpendicular to an arrangement direction of at least two installation positions and a barrier block installed at the boundary of two adjacent installation positions to prevent the swinging link rod from moving horizontally between the adjacent installation positions, and a claw buckle installed on the swinging link rod and detachably and rotably latched onto the rotating shaft. This structure changes the conventional adjusting method and uses the fixed barrier block to separate the adjacent installation positions without the problem of worrying about the precision and structure and adopts the detachable claw buckle to provide a convenient way of replacing the claw buckle that may be damaged after a long time of use.

3 Claims, 4 Drawing Sheets

FLAPPER DRAIN VALVE ADJUSTING STRUCTURE

BACKGROUND OF THE INVENTION

1. Field of the Invention

The present invention relates to the field of toilet drain valves, and more particularly to a flapper drain valve adjusting structure.

2. Description of Related Art

At present, a flapper is generally used for opening a drain valve installed in a water tank of a toilet, and the flapper has two swinging link rods installed on a side of the flapper and rotatably connected to a fixed rotating shaft, a chain connected to the top of the flapper, a hemispherical body downwardly protruded from the middle of the bottom of the flapper, and a rubber pad embedded around the hemispherical body. The flapper is generally dropped at the top of a water outlet of the drain valve, and the rubber pad abuts the periphery of the water outlet of the drain valve. When a user pulls a chain upwardly, the flapper swings upwardly by using the fixed rotating shaft as the center of the swing, so as to open a water outlet and allows the water in the water tank to flow out from the water outlet, and the hemispherical body has an air chamber formed therein for determining the falling speed after the chain is released, so as to achieve the effect of controlling the drainage quantity of water.

During the process of using a toilet, it is inevitable to have the issues of damaging the flapper and requiring a change of the flapper, but different models of flappers produced by different manufacturers vary, and flappers come with different sizes that cause the issues of incompatibility and inconvenient installation. With reference to FIG. 1 for a conventional flapper 100 developed by related manufacturers, the flapper body 1 is coupled to a first installation position 311 and a second installation position 312 of two swinging link rods 2, so that there are four methods available for the connection between the swinging link rod 2 and the flapper body 1. Specifically, a sideway movement adjusting plate 4 is installed between the first installation position 311 and the second installation position 312 for preventing the swinging link rod 2 from sliding freely as well as sliding the swinging link rod 2 between the first installation position 311 and the second installation position 312 for changing the installation position 31. In addition, a claw buckle is formed at the other end of each of the two swinging link rod 2 and provided for rotably fixing onto the fixed rotating shaft. From the description above, although the flapper structure can provide a wide applicability for the flapper, yet the requirements for the precision and structure are more stricter for the installation of the adjusting plate in actual manufacturing processes, thus causing the issues of failing to prevent the swinging link rod 2 from sliding freely and failing to adjust the installation position 31.

In view of the drawbacks of the prior art, the inventor of the present invention based on years of experience in the related industry to conduct extensive researches and experiments, and finally developed a flapper drain valve adjusting structure in accordance with the present invention to overcome the aforementioned drawbacks of the conventional flapper of a drain valve of a toilet.

SUMMARY OF THE INVENTION

Therefore, it is a primary objective of the present invention to provide a flapper drain valve adjusting structure to overcome the problems related to the precision of the conventional adjusting plate structure and the failure of preventing a swinging link rod from sliding freely or adjusting the installation position.

To achieve the aforementioned objective, the present invention provides a flapper drain valve adjusting structure, comprising:

at least two installation positions, disposed at a connection position of a flapper body and a swinging link rod;

a rotating shaft, with an axis perpendicular to an arrangement direction of at least two installation positions, and having a barrier block installed at the boundary of two adjacent installation positions for preventing the swinging link rod from moving horizontally between the adjacent installation positions; and a claw buckle, installed on the swinging link rod, and detachably and rotably latched onto the rotating shaft.

Wherein, the flapper drain valve adjusting structure further comprises a first liming block and a second limiting block, and the first limiting block is fixed onto the flapper body and disposed between the adjacent installation positions, and the second limiting block is installed on the swinging link rod, and the first limiting block and the barrier block are arranged at front and rear positions along the lengthwise direction of the swinging link rod respectively, and the first limiting block and the second limiting block limiting each other to prevent the swinging link rod from moving horizontally.

Wherein, the first limiting block is fixed onto the flapper body and disposed between the adjacent installation positions, and the second limiting block is installed on the swinging link rod, and the first limiting block and the barrier block are arranged at front and rear position along the lengthwise direction of the swinging link rod, and the first limiting block and the second limiting block limit each other to prevent the swinging link rod from moving horizontally.

Wherein, the flapper body includes a first stop and a second stop parallely installed at connecting position of the swinging link rods, and the first limiting block is installed between the first stop and the second stop and parallel to the first stop and the second stop, and the first limiting block divides a space between the first stop and the second stop into a first installation position and a second installation position, and the rotating shaft is perpendicularly installed between the first stop and the second stop.

The present invention relates to a flapper drain valve adjusting structure having the at least two installation positions and the barrier block for preventing the swinging link rod from moving horizontally between adjacent installation positions, so that the swinging link rod is stably situated at the current installation position. If it is necessary to change the position of the swinging link rod, the detachable relation between the claw buckle and the rotating shaft allows the swinging link rod to be detached from the rotating shaft, and then the swinging rod is installed at a required installation position. Compared with the prior art, the present invention changes the adjusting method completely and uses the fixed barrier block to separate the adjacent installation positions without the problem of worrying the precision and structure and adopts the detachable claw buckle to provide a convenient way of replacing the claw buckle that may be damaged after a long time of use.

BRIEF DESCRIPTION OF THE DRAWINGS

The invention, as well as its many advantages, may be further understood by the following detailed description and drawings in which.

DETAILED DESCRIPTION OF THE INVENTION

Preferred embodiments are provided for describing the technical characteristics of the invention as follows. It is noteworthy that same numerals are used for representing same respective elements of the preferred embodiments and the prior art.

Figure 1:
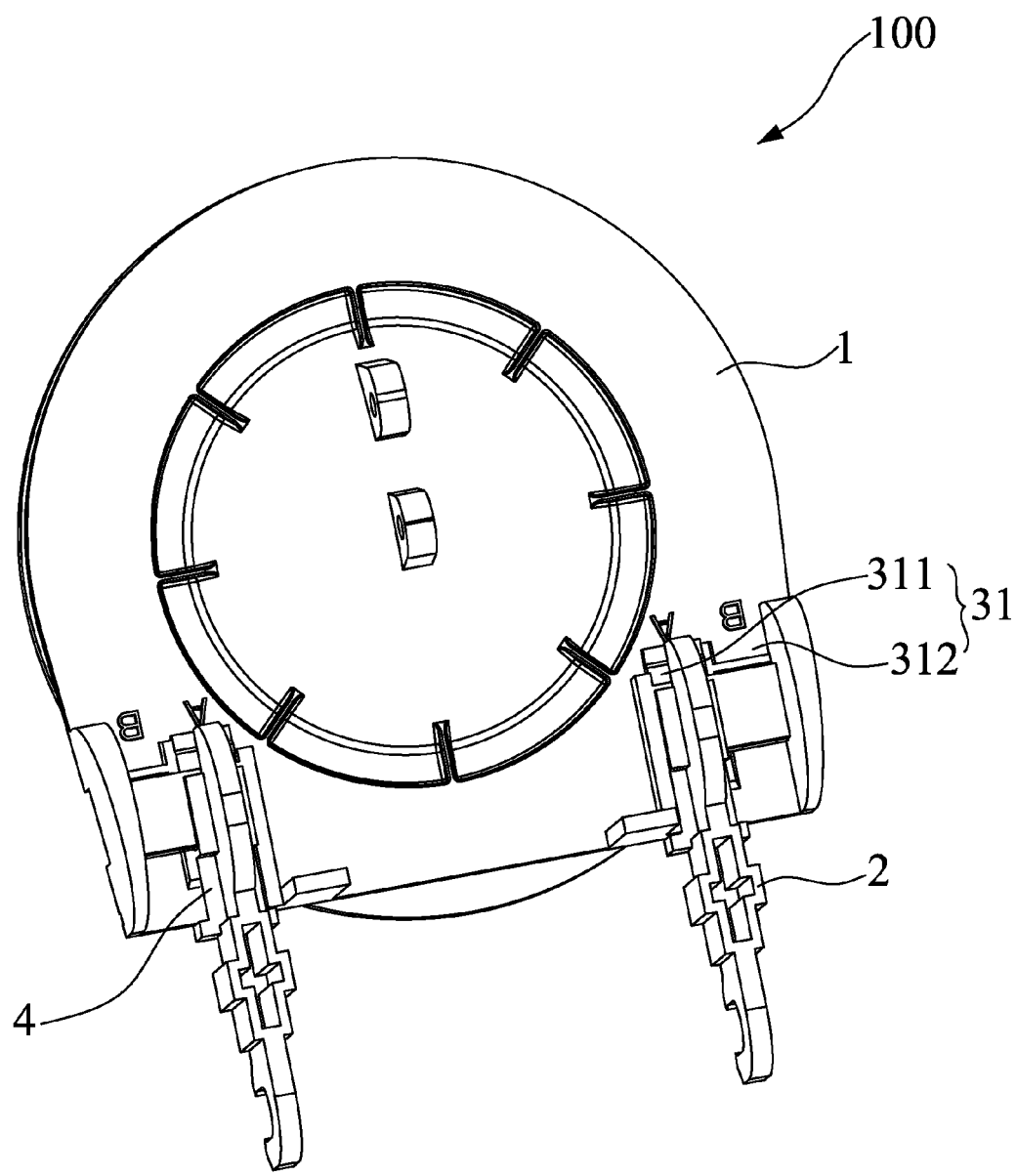
FIG. 1 is a schematic view of a conventional flapper structure.
Figure 2:
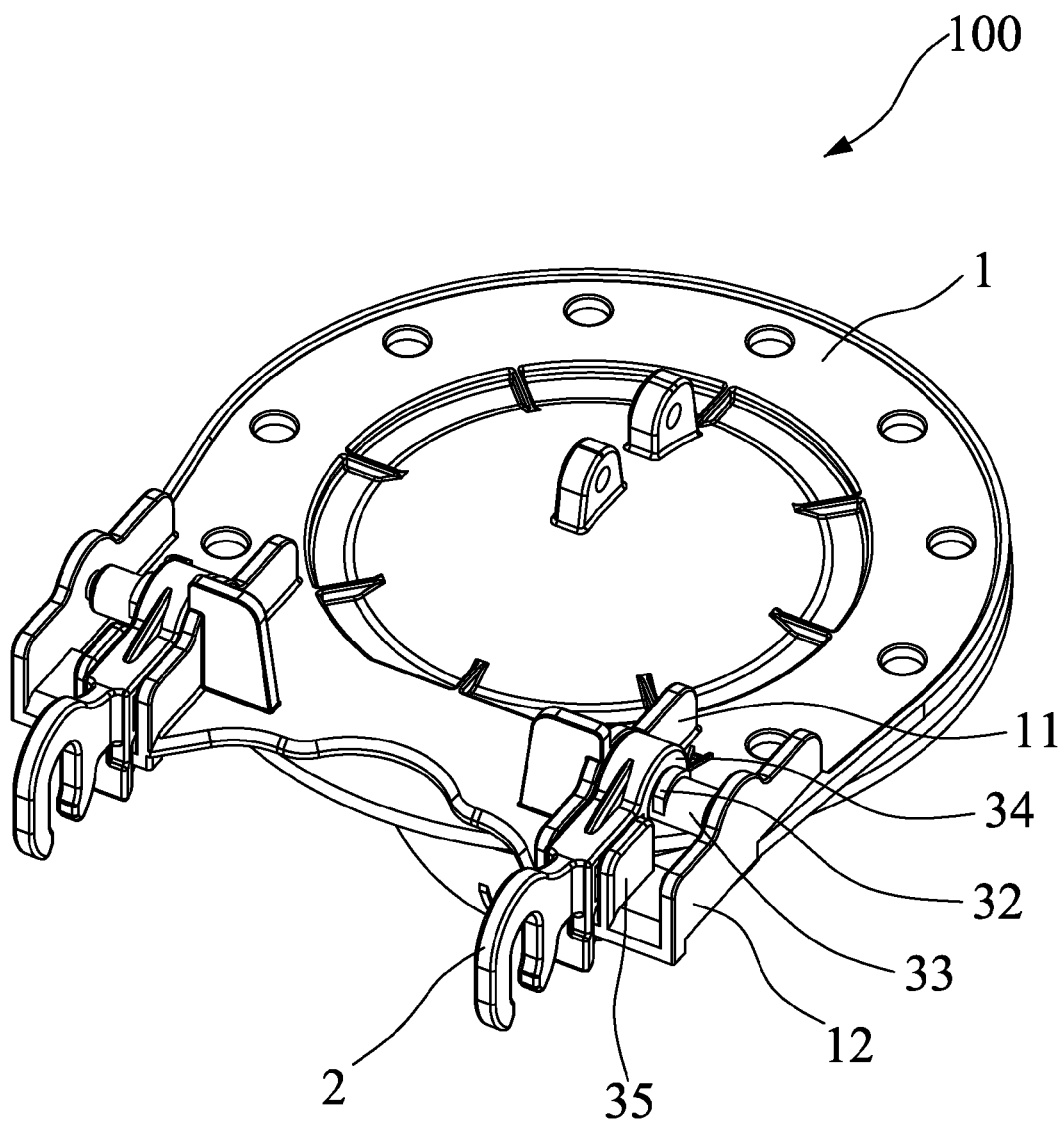
FIG. 2 is a schematic view of a flapper drain valve adjusting structure of the present invention situated at a first installation position.
Figure 3:
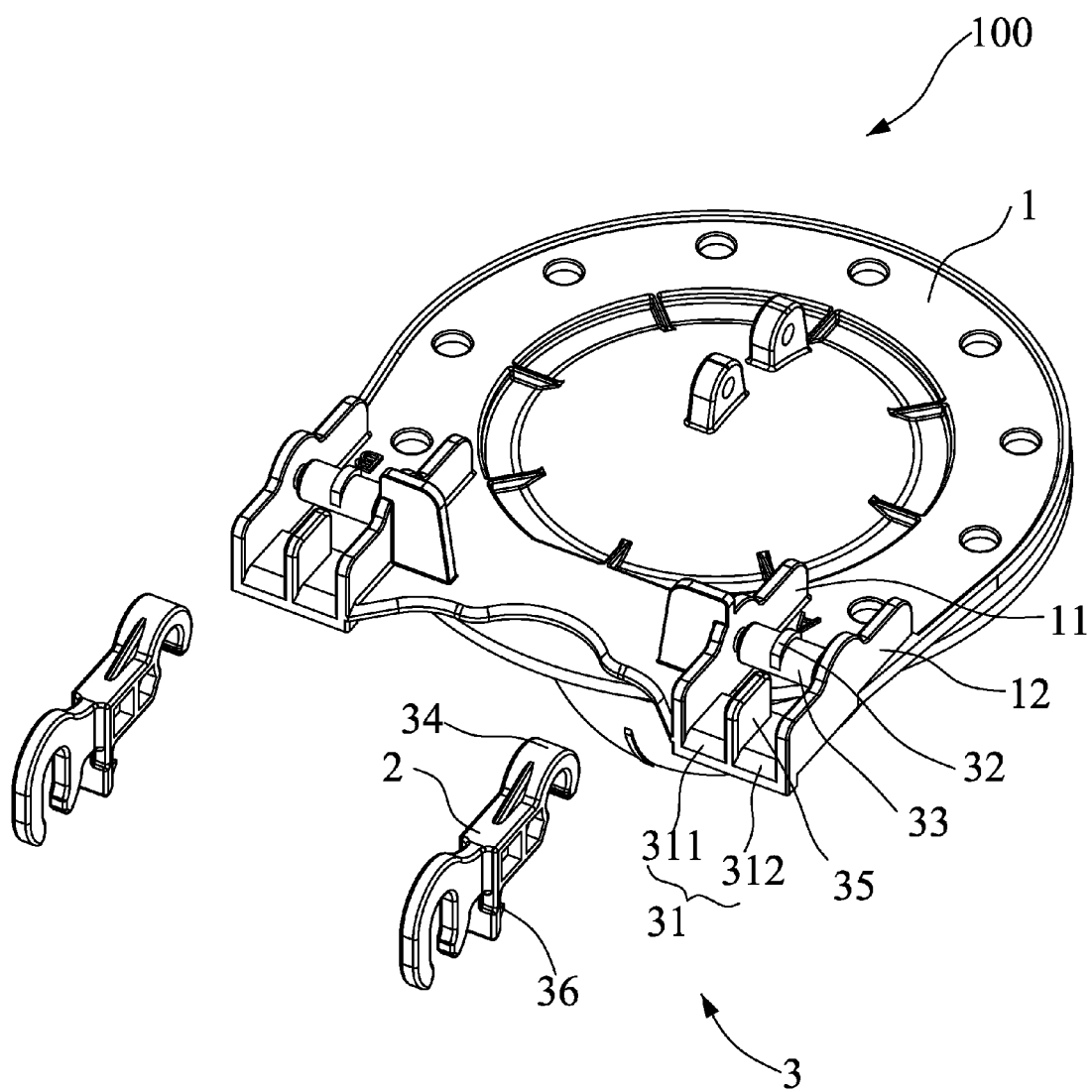
FIG. 3 is an exploded view of FIG. 2.
Figure 4:
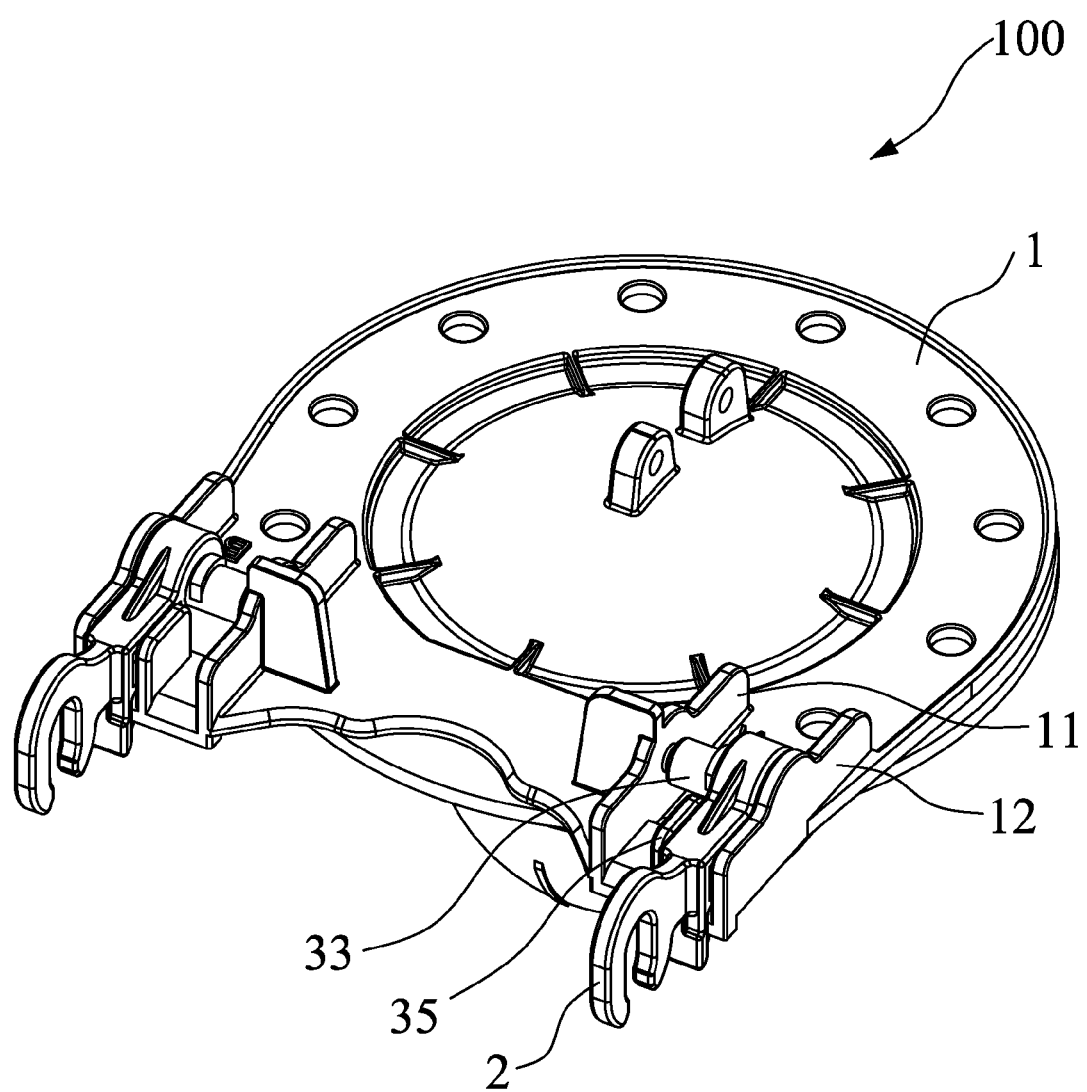
FIG. 4 is a schematic view of a flapper drain valve adjusting structure of the present invention situated at a first installation position.

With reference to FIGS. 2 and 3 for a schematic view and an exploded view of a flapper drain valve adjusting structure 3 of the present invention applied to a flapper 100, the flapper 100 comprises a flapper body 1, two swinging link rods 2 and an adjusting structure 3.

The adjusting structure includes at least two installation positions 31, a barrier block 32, a rotating shaft 33 and a claw buckle 34, wherein the at least two installation positions 31 are disposed at connecting positions of the flapper body 1 and the swinging link rod 2. The barrier block 32 is fixed on the rotating shaft and disposed at the boundary of the two adjacent installation positions 31 for preventing the swinging link rod 2 from moving horizontally between the adjacent installation positions 31. The rotating shaft 33 has an axis perpendicular to an aligning direction of the at least two installation positions 31. The claw buckle 34 is installed on the swinging link rod 2 and detachably and rotably latched onto the rotating shaft 33.

Since the present invention comes with at least two installation positions 31 and the barrier block 32 for preventing the swinging link rod 2 from moving horizontally between adjacent installation positions, so that the swinging link rod 2 can be stably disposed at the current installation position 31. If it is necessary to change the position of the swinging link rod 2, the detachable relation between the claw buckle 34 and the rotating shaft 33 allows the swinging link rod 2 to be detached from the rotating shaft 33, and then the swinging link rod 2 is installed at the required installation position 31.

In this preferred embodiment, each swinging link rod 2 has two installation positions 31, and the flapper drain valve adjusting structure 3 further comprises a first limiting block 35 and a second limiting block 36, and the first limiting block 35 is fixed onto the flapper body 1 and disposed between the adjacent installation positions, and the second limiting block 36 is disposed on the swinging link rod 2, and the first limiting block 35 and the barrier block 32 are disposed at front and rear positions along the lengthwise direction of the swinging link rod 2 respectively, and the first limiting block 35 and the second limiting block 36 limit positions of each other to prevent the swinging link rod 2 from moving horizontally.

Further, the flapper body 1 includes a first stop 11 and a second stop 12 parallely formed at connecting positions of the swinging link rods 2, and the first limiting block 35 is disposed between the first stop 11 and the second stop 12 and parallel to the first stop 11 and the second stop 12, and the first limiting block 35 divides the space between the first stop 11 and the second stop 12 into a first installation position 311 and a second installation position 312 which are an installation position A and an installation position B respectively. Of course, the first installation position 311 and the second installation position 312 are not limited to those described above. The rotating shaft 33 is perpendicularly installed between the first stop 11 and the second stop 12.

In summation of the description above, the present invention completely changes the conventional adjusting method and uses the fixed barrier block 32 to separate the adjacent installation positions 31 without the problem of worrying about the precision and structure and adopts the detachable claw buckle 34 to provide a convenient way of replacing the claw buckle 34 that may be damaged after a long time of use.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A flapper drain valve adjusting structure, comprising:
   at least two adjacent installation positions, disposed at a connection position of a flapper body and a swinging link rod;
   a rotating shaft disposed on the flapper body, with an axis perpendicular to an arrangement direction of the at least two adjacent installation positions, and the rotating shaft having a barrier block installed at a boundary of the at least two adjacent installation positions for preventing the swinging link rod from moving horizontally between the at least two adjacent installation positions; and
   a claw buckle, installed on the swinging link rod and positioned in one of the at least two adjacent installation positions, and the claw buckle detachably and rotatably latched onto the rotating shaft.

2. The flapper drain valve adjusting structure of claim 1, further comprising a first liming block and a second limiting block, and the first limiting block being fixed onto the flapper body and disposed between the at least two adjacent installation positions, and the second limiting block being installed on the swinging link rod, and the first limiting block and the barrier block being arranged at front and rear positions along a lengthwise direction of the swinging link rod respectively, and the first limiting block and the second limiting block limiting each other to prevent the swinging link rod from moving horizontally.

3. The flapper drain valve adjusting structure of claim 2, wherein the flapper body includes a first stop and a second stop, and the first limiting block is installed between the first stop and the second stop and parallel to the first stop and the second stop, and the first limiting block divides a space between the first stop and the second stop into a first installation position and a second installation position, and the rotating shaft is perpendicularly installed between the first stop and the second stop.

* * * * *